United States Patent [19]  [11] 3,897,309
Grabner  [45] July 29, 1975

[54] PROCESS FOR REMOVING PYROGENIC MATERIAL FROM AQUEOUS SOLUTIONS

[75] Inventor: Roy W. Grabner, North Plainfield, N.J.

[73] Assignee: Merck & Co., Inc., Rahway, N.J.

[22] Filed: Feb. 15, 1974

[21] Appl. No.: 443,063

[52] U.S. Cl. ............................................. 195/66 A
[51] Int. Cl. ........................................... C07g 7/028
[58] Field of Search ........................ 195/66 A, 66 B

[56] References Cited
UNITED STATES PATENTS 2,997,425  8/1961  Singher et al. .................... 195/66 B
3,634,196  1/1972  Wagner et al. .................... 195/66 A Primary Examiner—Lionel M. Shapiro
Attorney, Agent, or Firm—David L. Rose; J. Jerome Behan

[57] ABSTRACT

Trace amounts of pyrogens are removed from aqueous solutions by passing a strongly ionic solution thereof through a column of a basic anion exchange resin.

5 Claims, No Drawings

PROCESS FOR REMOVING PYROGENIC MATERIAL FROM AQUEOUS SOLUTIONS

DESCRIPTION OF THE PRIOR ART

L-asparaginase is a known enzyme which was discovered to have the ability to catalyze the hydrolysis of asparagine to aspartic acid and ammonia. It thus has found very promising utility as a remedy against tumors which require asparagine for their growth. L-asparaginase has generally been synthesized microbiologically using strains of *Escherichia Coli*. However, when the intracellular L-asparaginase is released from fermentation mixtures, there is also released from the *E. Coli* cells substantial quantities of endotoxins or pyrogens. These pyrogens as well as other pyrogens which may be introduced from fermentation media or non-aseptic process operations are difficult to remove from purified L-asparaginase and when administered, even in trace quantities along with L-asparaginase, certain toxic manifestations are noted in the subject being treated. It has been an object of those studying this area to find an efficient method for removing these pyrogens from L-asparaginase and other enzymes and injectable products, in order to minimize toxic side effects.

U.S. Pat. No. 3,634,196 describes a process for the removal of trace pyrogens from L-asparaginase which employs a column of diethylaminoethyl dextran gel and a weakly ionic buffer. By using this method L-asparaginase was obtained which resulted in a 0.48°C temperature rise in a USP Rabbit Pyrogen Test on rabbits at 200 units of enzyme per kg of animal.

However, L-asparaginase which passes the USP Rabbit Pyrogen Test at 200 units per kg has been found to still have certain toxic manifestations from the pyrogens remaining therein due to the dosages of L-asparaginase having been increased under current practices. As a result, the minimum dose level at which L-asparaginase must pass the USP Rabbit Pyrogen Test has been raised to 1,000 units per kg and the enzyme must also pass the Limulus Lysate Test at 2,500 units per ml. Thus work has continued on the search for a process which would achieve or surpass this test requirement and provide a product which would be safer for commercial operations. In addition work has been done in attempts to expand the process so that pyrogenic material may be removed from aqueous solutions other than L-asparaginase solutions. In this manner other enzymes and other products intended for injectable administration may be treated in order to render them free of pyrogenic material.

The instant invention as described hereinbelow has succeeded in both providing for a specific process for the removal of pyrogens from L-asparaginase and also in providing for a general process for the removal of pyrogenic material from aqueous solutions other than L-asparaginase solutions.

SUMMARY OF THE INVENTION

It is thus an object of this invention to describe a process for the removal of trace pyrogens from aqueous solutions. Another object of this invention is to describe a process for the removal of pyrogens from aqueous solutions of enzymes. Still another object is to describe a process for the removal of pyrogens from aqueous solutions of L-asparaginase. Another object is to describe a process wherein trace quantities of pyrogens are removed from L-asparaginase to the extent that the resultant purified L-asparaginase will surpass the USP Rabbit Pyrogen Test at 1,000 units per kg and the Limulus Lysate assay at 2,500 units ml. A further object is to describe a process in which the trace pyrogens are selectively adsorbed from a solution of L-asparaginase. A still further object is to describe a process in which the trace pyrogens are caused to be selectively adsorbed onto a column of a basic anion exchange resin by dissolving the impure L-asparaginase in a solution of high ionic strength. Further objects will be obvious upon a further reading of the disclosure.

DESCRIPTION OF THE INVENTION

U.S. Pat. No. 3,634,196 describes a process in which L-asparaginase which contains quantities of pyrogens is treated with a weakly ionic (0.024 m) buffer solution and passed through a column of diethylaminoethyl sephadex dextran gel. During this process the L-asparaginase is adsorbed onto the dextran gel and the column then eluted with a gradient of concentration of the same weakly ionic buffer solution in order to separate the pyrogens from the enzyme. This prior art process is not however selective enough to remove sufficient pyrogens in order to pass the USP Rabbit Pyrogen Test at the new requirement of 1,000 units per kg. In addition the process is one of limited capacity providing only small quantities of the enzyme.

The USP Rabbit Pyrogen Test consists of three rabbits which when administerd a drug, show a temperature rise due to the presence of pyrogenic material of less than 0.6°C for any individual rabbit and the sum of the temperature rises for all three rabbits must be no more than 1.4°C.

Another test procedure employed for the specific determination of the presence of endotoxin is the Limulus Lysate assay. This assay reagent consists of lysate of the circulating amebocytes of the blood of *Limulus polyphemus* (horseshoe crab). The lysate reagent is combined with the test sample (with suitable controls) and incubated at 37°C for from ½ to 1 hour. If any endotoxin is present, the test solution will form a gel. The test is generally considered to be more sensitive to endotoxins than the USP Rabbit Pyrogen Test and is used in the laboratory because of the speed of the test, the small sample of test material required (0.1 ml), the specificity of the assay to endotoxins and the simplicity of the assay in that no special equipment is required. A comparison of the procedures and the results of the USP Rabbit Pyrogen Test and the Limulus Lysate assay is found in the *Journal of Laboratory and Clinical Medicine*, Vol. 78, p. 38–48 (1971).

It has been surprisingly discovered that pyrogens can be removed from aqueous solutions thereof by passing said aqueous solution which has high ionic strength through a basic anion exchange resin. The pyrogens are irreversibly adsorbed onto the basic anion exchange resin and the pyrogen free aqueous solution is displaced from the column. The pH of the solution is maintained at from 6.0 to 10.0 by the use of suitable mineral acids or alkali metal or alkaline earth metal hydroxides, carbonates or bicarbonates.

More specifically, it has been discovered that when impure L-asparaginase is dissolved in a strongly ionic buffer solution and passed through a column of a basic anion exchange resin the pyrogens are then selectively and irreversibly adsorbed onto the anion exchange resin while the L-asparaginase solution, free of pyrogens passes through the column. In this manner L-asparaginase can be recovered which meets and surpasses the requirement that the USP Rabbit Pyrogen Test at 1,000 units per kg and the Limulus Lysate assay at 2,500 units per ml are passed.

In carrying out one aspect of the process of this invention, L-asparaginase containing trace quantities of pyrogens is dissolved in a buffer solution of high ionic strength; from 0.1 to 0.2m. The preferred concentration is from 0.11 to 0.14m with 0.12m being the most preferred concentration. In addition a sterilizing agent such as formaldehyde may be added to pretreat the gel in order to preserve the sterility of the chromatographic system. Any standard buffering agent or salt may be employed to provide the high ionic strength solution required by this invention. Exemplary buffers and salts are TRIS buffer (2-amino-2-hydroxymethyl-1,3-propanediol); alkali metal and alkaline earth metal carbonates, bicarbonates, or phosphate; ammonium salts such as ammonium chloride, ammonium acetate, ammonium formate and the like; alkali metal and alkaline earth earth metal chlorides and the like. The phosphate ion is preferred as the anion of the buffer. Generally potassium dihydrogen phosphate is employed. The pH of the buffer solution is carefully monitored and maintained at from 7.0 to 7.5 in order to insure the stability of the enzyme. If necessary dilute mineral acids or alkali metal or alkaline earth metal hydroxides may be added to maintain the pH within this range. The L-asparaginase is dissolved in a buffer solution within the above conditions and passed through a column of a basic anion exchange resin. Within the above concentration the pyrogens are selectively adsorbed onto the basic anion exchange resin affording pyrogen free L-asparaginase.

Various basic anion exchange resins may be employed in the performance of this invention with a natural or synthetic polymeric backbone and basic groups either of the quaternary ammonium or of the amine type substituted thereon. Exemplary anion exchange resins are Whatman DE–52, Amberlite IRA–938, Dowex 1×2, Sephadex DEAE-A–25 and Sephadex DEAE-A–50. Whatman DE–52 is a microgranular cellulose resin with diethylaminoethyl groups substituted thereon manufactured by W & R Balston Ltd. of Maidstone, Kent, England. Amberlite IRA–938 is a polystyrene-divinylbenzene resin with trimethyl ammonium groups substituted thereon marketed by Rohm and Haas Co. of Philadelphia, Pa. Dowex 1×2 is a polystyrenedivinylbenzene resin with trimethyl benzyl ammonium groups substituted thereon marketed by the Dow Chemical Co. of Midland, Mich. Sephadex DEAE A–25 and DEAE A–50 are dextran gels with diethylaminoethyl groups substituted thereon marketed by Aktiebolaget Pharmacia of Uppsala, Sweden.

The process of this invention has a further advantage over the prior art in that highly concentrated aqueous pyrogenic solutions may be passed through short columns (height to diameter ratio of up to about 1/1) with results equal to those obtained with more dilute solutions. In the case of L-asparaginase, solutions of up to about 5% concentration may be employed. This is important for commercial purposes in that it results in high productivity and maximum flow rates of pyrogen free solutions.

The process is carried out by combining the basic anion exchange resin with the high ionic strength buffer solution, adjusted if necessary to the proper pH, and allowing the resin to equilibrate. The anion exchange resin is then transferred to the column, packed and washed with the buffer solution. The aqueous solution of the substance to be purified such as L-asparaginase in the same phosphate buffer is then passed through the column at a rate of from 1 to 8 ml per hour per square centimeter of cross section of the column.

Since the enzyme is not being adsorbed onto the gel, it is not necessary to elute the column with a gradient of salt concentrations as is prevalent in the prior art. The pyrogens are irreversibly adsorbed onto the column in high ionic strength buffer solutions, and it is only necessary to use the single concentration of eluant to displace the pyrogen free solution from the column.

Once the aqueous pyrogen free solution is removed from the column, the substance to be purified is isolated from the buffer solution by techniques known to those skilled in this art.

As a result of the removal of the pyrogens from the aqueous solution by the process of this invention, the purity of the substance isolated from the buffer solution is generally increased. In the case of L-asparaginase, enzymes of a purity greater than 20 units per mg of protein may be fed into the column. L-asparaginase of up to about 450 units per mg are displaced from the column. It is generally preferred to use the instant process as the final step in the purification of L-asparaginase in which the enzyme fed into the column is already substantially purified (about 200 units per mg of protein or greater) and the only impurity present is the pyrogenic material. With such a procedure, the enzyme extracted from the column is sufficiently free of pyrogens so that the dried product can then be used in cancer chemotherapy with very little, if any, toxic manifestations.

The invention is exemplified but not limited by the following examples.

EXAMPLE 1

292 grams of diethylaminoethyl sephadex A–50 dextran gel obtained from Aktiebolaget Pharmacia of Uppsala, Sweden is equilibrated in 16 liters of 0.12m. phosphate buffer (sodium dihydrogen phosphate) at pH 7.2 The resin is transferred to a 15 centimeter diameter Pyrex column, packed and washed with 0.12 m. phosphate buffer at pH 7.2. The column effluent is tested in the Limulus Lysate assay for endotoxins and is shown to be free of endotoxin impurities. The packed resin volume is 4,800 ml. with a height to diameter ratio of 1.8:1.

4,000 ml. of L-asparaginase aqueous feed solution (10,930 units per ml., 271 units per mg. protein) is adjusted to 0.12 m. phosphate and pH 7.2 by adding concentrated phosphate (in the form of sodium dihydrogen phosphate) and dilute sodium hydroxide solutions. The buffered L-asparaginase solution is charged to the resin column and eluted with 0.12 m. buffer. L-asparaginase is detected in the column effluent after collecting a 3,900 ml. forecut. L-asparaginase rich fractions are then collected and assayed for asparaginase activity and endotoxin impurities by the Limulus Lysate test.

The L-asparaginase rich fractions are pooled, adjusted to pH 5.1 with dilute acetic acid and precipitated with ethanol. The slurry is centrifuged and the solids dissolved in 0.01 m. sodium phosphate buffer and adjusted to pH 7.4 with dilute sodium hydroxide solution. Turbid L-asparaginase solution (9,400 units per ml.) contained 73 percent of the feed activity and had a specific activity of 285 units per mg. of protein. The solution is then clarified and sterilized by filtration through a 0.22 micron filter.

The column feed and the clarified L-asparaginase solution are assayed by USP Rabbit Pyrogen Test at a dose level of 1,000 units per kg. and showed average temperature rises for three rabbits of 0.73° and 0.13°C respectively. The clarified L-asparaginase solution thus easily passed USP pyrogen specifications. In addition the Limulus Lysate assay did not detect any endotoxins (no gel in 60 minutes) at a concentration of 2,500 units per ml. whereas the feed solution was positive (gel in 20 minutes) at a concentration of 100 units per ml.

EXAMPLE 2

300 grams of diethylaminoethyl sephadex A–50 resin is equilibrated in 17 liters of 0.12 m. phosphate buffer at pH 7.4 containing about 0.5 percent formaldehyde to maintain the sterility of the resin. The resin slurry is agitated for 20 hours, then packed and washed with 0.12 m. phosphate buffer into a 15 centimeter column. All operations are carried out at room temperature. The resin bed volume is 6,800 ml. with a height to diameter ratio of 2.2:1. 5,500 ml. of L-asparaginase feed solution (12,300 units per ml., 385 units per mg.) is adjusted to 0:11 m. phosphate and pH 7.4 with potassium hydroxide (0.1 N). L-asparaginase is displaced from the column with 0.12 m. phosphate buffer at pH 7.4. L-asparaginase rich fractions of about 1 liter each (8 fractions taken) are collected after a forecut of 6,000 ml. which is discarded. The L-asparaginase rich fractions are pooled, adjusted to pH 5.1, and crystalized with ethanol. The enzyme rich fractions showed no endotoxins by the Limulus Lysate assay (no gel in 60 minutes). The slurry is centrifuged to collect the solids, 548 grams of which are dissolved in 0.01 m. phosphate buffer and adjusted to pH 7.3 with 0.1 N sodium hydroxide. Undissolved solids are removed by centrifugation yielding a solution (10,600 units per ml., 409 units per mg. protein) containing 92 percent of the original L-asparaginase activity. This solution was tested in the Limulus Lysate assay at 10,000 units/ml. and resulted in no gel after 60 minutes. The solution is further clarified and sterilized by filtration through a 0.22 micron filter.

The column feed, pooled fractions and clarified solutions are assayed for pyrogens by the USP Rabbit Pyrogen Test at a dose of 1,000 units per kg. with an average temperature rise for three rabbits of 1.07°, 0.20° and 0.10°C respectively. The clarified L-asparaginase solution is also tested at 8,000 units per kg. with an average temperature rise of 0.5°C for three rabbits. The Limulus Lysate assay did not detect (no gel in 60 minutes) any endotoxin activity in the clarified solution at a concentration of 2,500 units per ml.

EXAMPLE 3

Pyrogenic tap water (average temperature rise of 1.5°C per rabbit) which shows a strong positive responce (gel in 10 minutes at 1/100 dilution) by Limulus Lysate assay is adjusted to 0.12 m. in potassium phosphate and pH 8.0 with sodium hydroxide. Aliquots of the solution are passed over various anionic resins (Dowex 1×2, Amberlite IRA–938, Sephadex DEAE-A–25) equilibrated in the same buffer at pH 8.0. Twenty bed volumes of water are passed through each column and the column effluents pooled separately. Pools as well as column effluent samples collected after 20 bed volumes of feed are all negative (no gel in 60 minutes) by Limulus Lysate assay. When the pools are tested for pyrogens by rabbit pyrogen test, they passed USP specifications with average temperature increases of 0.3°, 0.1° and 0.2°C per rabbit for Amberlite IRA–938, Sephadex DEAE-A–25 and Dowex 1×2 respectively.

EXAMPLE 4

Pyrogenic tap water is used to prepare 0.12 m. sodium phosphate buffer at pH 7.4. This pyrogenic buffer is passed over Dowex 1×2, Whatman DE–52 and Sephadex DEAE-A–25 equilibrated in the same buffer. Ten bed volumes of buffer are passed through each column and the column effluents collected. Pools are all negative by (no gel in 10 minutes) Limulus Lysate assay and passed USP pyrogen specifications with average temperature rise of 0.2°, 0.2°, 0.1°C per rabbit for Dowex 1×2, Whatman DE–52 and Sephadex DEAE-A–25 respectively.

EXAMPLE 5

A pyrogenic solution is prepared by dissolving standard E. Coli endotoxin preparation (Mallinkrodt Chemical Works, St. Louis, Mo.) in pyrogen free water. The standard E. Coli endotoxin is diluted to a concentration of 10 mg. per ml. The solution is highly pyrogenic in the USP Rabbit Pyrogen Test (1.2°C temperature rise per rabbit test 1/1,000 dilution) and showed a strong reaction in the Limulus Lysate test (gel in 10 minutes at 1/1,000 dilution). The solution is adjusted to 0.12 m. in potassium phosphate and pH 7.2 with potassium hydroxide. Aliquots of endotoxin solution are passed through columns of Sephadex DEAE-A–50, Dowex 1×2, and Whatman DE–52 equilibrated in 0.12 m. potassium phosphate buffer at pH 7.2. The column effluents are monitored by Limulus Lysate assay to detect any breakthrough of endotoxins. The column effluents are negative (no gel in 10 minutes) for 12, 5 and 8 bed volumes for the Sephadex DEAE-A–50, Dowex 1×2 and Whatman DE–52 resins respectively. Rabbit Pyrogen Tests at 1 to 10 dilution to reduce buffer concentration also indicated that pyrogens are removed as the pools passed USP specifications with average temperature rise of 0.2°, 0.4°, 0.3°C respectively.

What I claim is:

1. A process for the separation of pyrogenic material from L-asparaginase which comprises dissolving said enzyme in a buffer solution of ionic strength of from 0.1 to 0.2 m. at a pH of from 7.0 to 7.5, passing the enzyme solution through a column of diethylaminoethyl dextran gel equilibrated with said buffer solution, and eluting the L-asparaginase from the column with said buffer solution.

2. A process of claim 1 wherein said buffer solution of high ionic strength is a phosphate buffer solution of from 0.1 to 0.2 m.

3. A process of claim 2 wherein said buffer solution of high ionic strength is a phosphate buffer solution of from 0.11 to 0.14 m.

4. A process of claim 3 wherein said buffer solution of high ionic strength is a phosphate buffer solution of 0.12 m.

5. A process of claim 2 wherein said buffer solution of an ionic strength of from 0.1 to 0.2 is an alkali metal or alkaline earth metal phosphate buffer.

* * * * *